(12) United States Patent
Abbott

(10) Patent No.: US 8,551,278 B2
(45) Date of Patent: Oct. 8, 2013

(54) METHODS FOR CONTROLLED APPLICATION OF ADHESIVE

(75) Inventor: Michael D Abbott, Statesville, NC (US)

(73) Assignee: HBI Branded Apparel Enterprises, LLC, Winston-Salem, NC (US)

( * ) Notice: Subject to any disclaimer, the term of this patent is extended or adjusted under 35 U.S.C. 154(b) by 1265 days.

(21) Appl. No.: 11/699,835

(22) Filed: Jan. 30, 2007

(65) Prior Publication Data

US 2007/0226870 A1    Oct. 4, 2007

Related U.S. Application Data

(60) Provisional application No. 60/763,312, filed on Jan. 30, 2006.

(51) Int. Cl.
*A41C 3/00* (2006.01)
*B32B 5/00* (2006.01)

(52) U.S. Cl.
USPC ............ 156/291; 156/60; 2/69; 428/156

(58) Field of Classification Search
None
See application file for complete search history.

(56) References Cited

U.S. PATENT DOCUMENTS

| 3,253,598 | A | | 5/1966 | Spanel |
| 3,489,154 | A | | 1/1970 | Kaspar et al. |
| 3,841,952 | A | * | 10/1974 | Kimura et al. ............... 442/168 |
| 4,262,049 | A | | 4/1981 | Kaspar .......................... 428/131 |
| 4,701,964 | A | | 10/1987 | Bell et al. |
| H1989 | H | * | 9/2001 | Fell et al. ...................... 156/229 |
| 7,060,157 | B1 | * | 6/2006 | Bauer et al. .................. 156/291 |
| 2004/0209093 | A1 | * | 10/2004 | Keuchel et al. ............ 428/474.4 |
| 2005/0148965 | A1 | * | 7/2005 | Richlen et al. ................ 604/367 |
| 2006/0211317 | A1 | | 9/2006 | Rossi et al. ................... 442/149 |

OTHER PUBLICATIONS

International Search Report (PCT/US07/02650, filed Jan. 30, 2007).

* cited by examiner

*Primary Examiner* — Barbara J Musser
(74) *Attorney, Agent, or Firm* — Womble Carlyle Sandridge & Rice LLP; Jeffrey R. McFadden

(57) ABSTRACT

A method of manufacturing a garment is provided that includes applying an adhesive layer to a first ply and/or a second ply in a first amount in a first zone where structural support is desired and in a second amount in a second zone where breathability is desired; arranging the first and second plies with respect to one another so that the adhesive layer is therebetween; and activating the adhesive layer to secure the first and second plies to one another.

5 Claims, 7 Drawing Sheets

US 8,551,278 B2

METHODS FOR CONTROLLED APPLICATION OF ADHESIVE

CROSS REFERENCE TO RELATED APPLICATIONS

This application claims the benefit of U.S. Provisional Application Ser. No. 60/763,312, filed Jan. 30, 2006, the contents of which are incorporated by reference herein.

BACKGROUND OF THE INVENTION

1. Field of the Invention

The present disclosure relates to a garment and method of making the same. More particularly, the present disclosure relates to a method of applying an adhesive to a first ply and a second ply.

2. Description of the Related Art

Application of an adhesive to a ply to secure the ply to another or second ply is known in the art. The ply may be a nylon, a spandex fabric, a cotton or a combination fabric. The adhesive may be any heat setting adhesive known in the art. The adhesive is applied and the ply is heated or allowed to dry to connect the ply to another second ply.

Such known garments have a number of problems. First, the garment are very uncomfortable. Having an intermediate layer of adhesive with a thickness between the first ply and the second ply prevents both heat, and perspiration from escaping the garment and also prevents air from entering the garment to cool the wearer.

Secondly, such garments of the prior art having the adhesive layer being disposed between the first ply and the second ply become very rigid. This rigidity is due to the thick solidified adhesive therebetween. The garment thus looses its overall flexibility. The garment will not bend and becomes very stiff. The stiff garment is then very uncomfortable to the wearer, and it takes a long period of time to become worn and comfortable.

Furthermore, a manufacturer may desire control only in preselected areas of the garment while in others less control. In prior art adhesive garments, the entire garment having a uniform adhesive layer has the adhesive providing control in areas that need no or little control. This wastes manufacturing capital. Moreover, the application of the adhesive to these areas results in lost productivity and increased material and labor costs attributed to the application of adhesive to areas of the garment that require little or no adhesive.

Accordingly, there is a need for a method for the application of adhesive to a garment that provides adhesive to some areas and not other areas. There is also a need for such a reliable and safe method that has the application of the adhesive to the garment where the adhesive is variably applied.

SUMMARY OF THE INVENTION

A method for the application of an adhesive is provided for applying adhesive to a ply where the adhesive is applied to some areas for structure and not applied to other areas for increased porosity.

A method for the application of an adhesive is also provided for applying adhesive to a ply where the adhesive is applied having a variable thickness and/or weight per unit area.

Further, a method for the application of adhesive is provided for applying adhesive to a ply where the adhesive is applied in a variable manner.

In some embodiments, the method includes applying an adhesive layer to a first ply and/or a second ply in a first amount in a first zone where structural support is desired and in a second amount in a second zone where breathability is desired; arranging the first and second plies with respect to one another so that the adhesive layer is therebetween; and activating the adhesive layer to secure the first and second plies to one another.

In addition, a garment is provided that includes a first ply, a second ply, and an adhesive layer securing the first and second plies to one another. The adhesive layer has a plurality of different zones each having a different amount of adhesive therein.

The above-described and other features and advantages of the present disclosure will be appreciated and understood by those skilled in the art from the following detailed description, drawings, and appended claims.

DETAILED DESCRIPTION OF THE INVENTION

Figure 1:
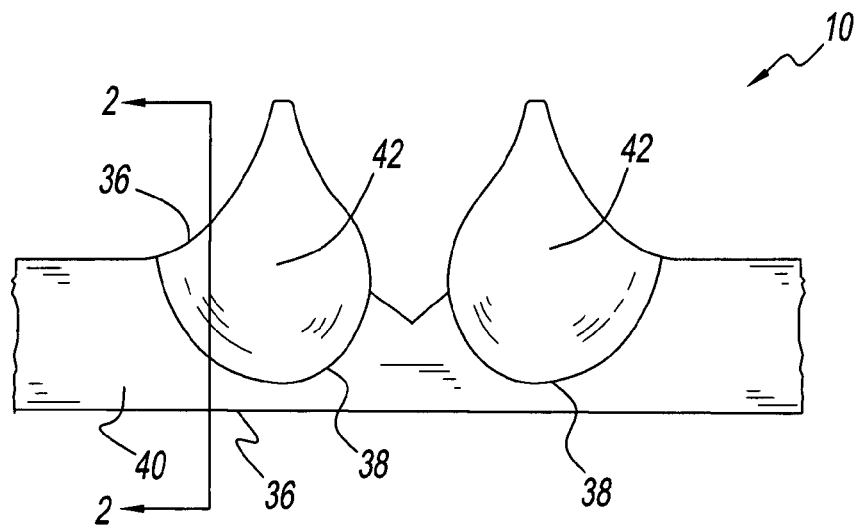
FIG. 1 shows an exemplary embodiment of a garment according to the present disclosure.
Figure 2:
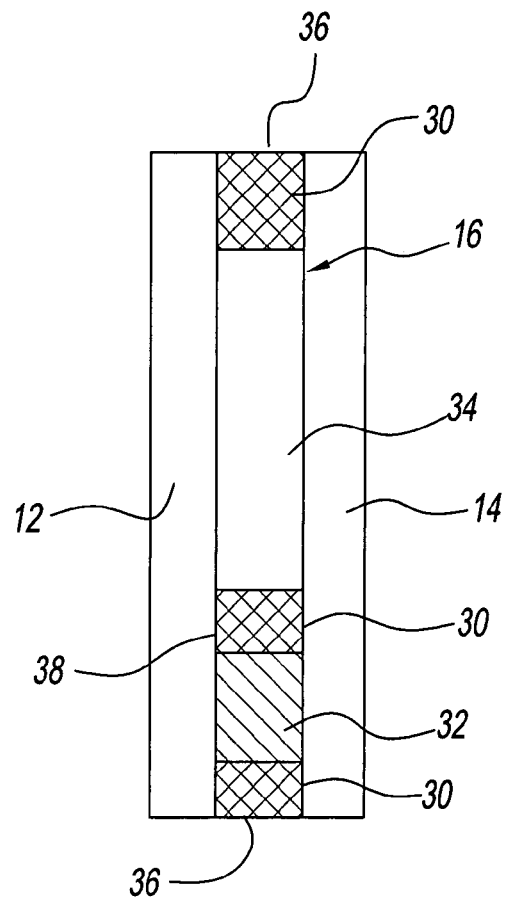
FIG. 2 is a sectional view of the garment of FIG. 1 taken along line 2-2.

Referring to the figures and in particular FIGS. 1 and 2, there is shown a garment of the present disclosure generally represented by reference numeral 10. The garment 10, although shown as a brassiere, can be any clothing or article of clothing known in the art. The garment 10 may be a circular knit garment, a cut and sew garment or any other garment for clothing an individual known in the art. The present disclosure is intended to encompass any garment 10 known in the art such as control garments, brassieres, knit panties, sweaters, shirts such as button down shirts, tee shirts, jerseys, pants, shorts, male or female undergarments, hats, and any combinations thereof.

The garment 10 preferably has a first ply or layer 12 and a second ply or layer 14. The first and second plies 14 may be the same or a different material depending on the design of the garment 10. One of the plies 12, 14 faces the wearer, while the other ply is opposite the wearer or faces the outside of garment 10.

The first ply 12 may be cotton, wool, hemp, nylon, polyester, rayon, any natural or man-made fiber, and blends of the foregoing. Likewise, the second ply 14 may be cotton, wool, hemp, nylon, polyester, rayon, any natural or man-made fiber, and blends of the foregoing.

The first and second plies 12, 14 are secured to one another by an adhesive layer 16. The adhesive layer 16 is preferably disposed on the first ply 12 and/or the second ply 14. For purposes of clarity, adhesive layer 16 is described herein by way of example being applied to first ply 12. The adhesive layer 16 may be applied in a number of different manners. The adhesive layer 16 may be applied by spraying, beading, pouring, squeezing, application by a tool such as a squeegee tool or any combinations thereof.

Figure 3:
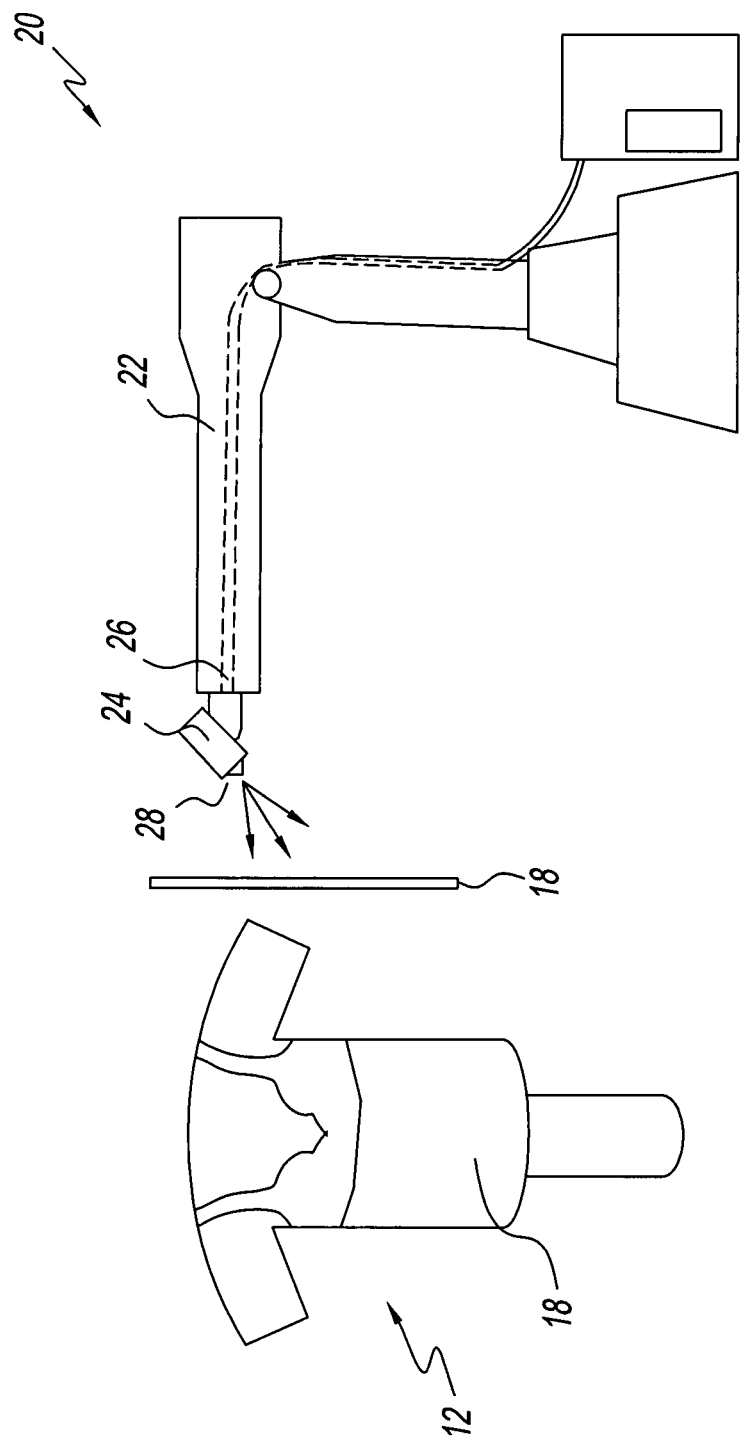
FIG. 3 is a perspective view of an exemplary embodiment of a spray device for application of an adhesive layer according to the present disclosure.

For example, the adhesive layer 16 can sprayed onto the first ply 12 as illustrated in FIG. 3. Here, first ply 12 is positioned on a holding or forming device 18 (hereinafter "former"). The adhesive layer 16 is preferably sprayed on by a spray device 20. The spray device 20 can have an elongated movable arm 22 with a spray gun 24 at an end 26. The spray device 20 preferably sprays the adhesive layer 16 under pressure onto the first ply 12 through a nozzle 28

The adhesive layer 16 can be a polyurethane adhesive, a polyamide adhesive, or any other adhesive suitable for securing the first and second plies 12, 14 to one another. The spray device 20 and/or the former 18 are movable with respect to one another.

Advantageously, the adhesive layer 16 is applied in a variable pattern to the first or second plies 12, 14. As used herein, the term variable pattern shall mean that the adhesive layer 16 has a change in one or more of the thickness of the layer and/or the weight per unit area of the layer. For example, some points of the adhesive layer 16 may have a first thickness while others point may have a second, different thickness.

In some embodiments, a screen 21 can be disposed between the spray device 20 and the first ply 12. The adhesive layer 16 may be sprayed out from the nozzle 28 through the screen 21 on to the garment 10. In this manner, the screen 21 may be used to assist in varying the amount of adhesive being deposited on the first ply 12.

Figure 4:
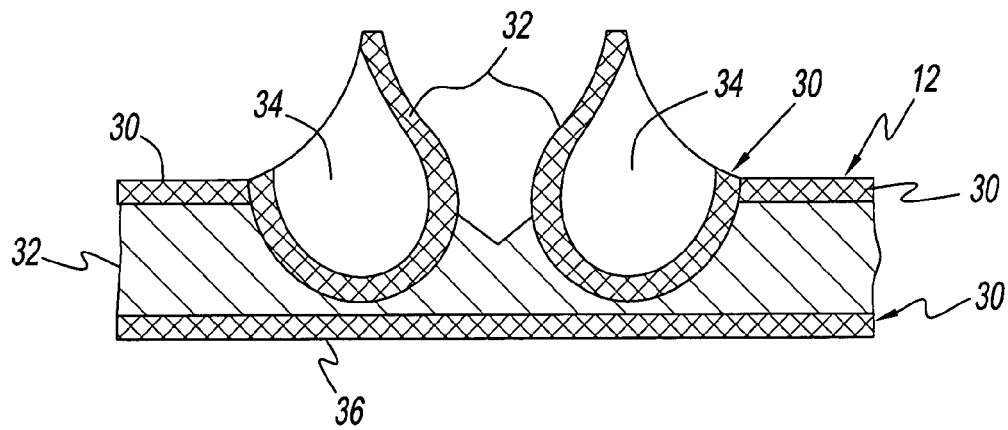
FIG. 4 is view of the garment of FIG. 1 having a second ply removed to reveal the adhesive layer.

Referring now to FIGS. 1, 2, and 4, the garment 10 advantageously has a number of zones of adhesive layer 16. Each zone of the adhesive layer 16 has a variable thickness and/or weight per unit area to provide a desired physical attribute to the garment 10. For example, adhesive layer 16 can include one or more first zones 30, one or more second zones 32 (only one shown), and one or more third zones 34 (only one shown).

The first zone(s) 30 includes a sufficient amount of adhesive in the adhesive layer 16 to provide structural support to the garment 10. The amount of adhesive in the adhesive layer can be defined by the thickness of the layer in the zone and/or by the weight per unit area of the adhesive. For example, first zone 30 can have a thickness of between about 0.002 inches (2 mil) to about 0.006 inches (6 mil), more preferably about 0.004 inches (4 mil). In addition, first zone 30 can have a weight of between about 20 grams per square meter ($g/m^2$) to about 40 $g/m^2$, more preferably about 30 $g/m^2$.

Since the first zone 30 imparts structural support to the garment 10, the first zone finds use in areas of the garment that require structural support. For example, first zone 30 finds use at edges 36 of the garment 10, at a lower periphery 38 of a breast cup 40, and in any area that requires structural support. Application of the first zone 30 at the lower periphery 38 can be used instead of a traditional underwire or to enhance the support of a traditional underwire. It has also been found that application of the first zone 30 at edges 36 prevents the edges of the first and second plies 12, 14 from unraveling.

The second zone 32 includes a sufficient amount of adhesive in the adhesive layer 16 to secure the first and second plies 12, 14 while still allowing breathability or permeability through the garment 10. For example, second zone 32 can have a thickness of under about 0.002 inches (2 mil) and a weight of about 40 $g/m^2$.

Since second zone 32 secures the first and second plies 12, 14 and imparts breathability to the garment 10, the second zone finds use in areas of the garment that require some support but also breathability. For example, second zone 32 finds use in a band portion 40 of the garment 10 and in any area that requires breathability.

The third zone 34 can include no adhesive, such that the third zone defines an opening or void in the adhesive layer 16. The third zones 34 find use in regions of the garment 10 that require enhanced flexibility and a maximum amount of breathability, such as in a breast cup 42 of the garment.

It should be recognized that zones 30, 32, 34 are described above as having a particular thickness or weight that abruptly changes between zones. However, it is contemplated by the present disclosure for garment 10 to include a transition area between one or more of the zones 30, 32, 34. Advantageously, the amount of adhesive in the transition area gradually increases and/or decrease throughout the area so that the abrupt change in thickness or weight between zones is eliminated.

Accordingly, the present disclosure thus provides for structural support at certain desired locations of the garment 10 where control is desired, breathability at other locations, and flexibility in still other areas of the garment. Advantageously, the spray device 20 can be controlled to spray the adhesive layer 16 in a desired pattern such as applying the greatest amount of adhesive where support is desired, lower amounts where porosity and breathability are desired, and no adhesive where flexibility is desired.

Once adhesive layer 16 is applied to the first ply 12, the second ply 14 can be placed over the adhesive layer. The adhesive layer 16 can then be activated to secure the first and second plies 12, 14 to one another. In some embodiments, the first and second plies 12, 14 can be pressed together before, during, or after activation of the adhesive layer 16.

It should be recognized that adhesive layer 16 is described above by way of example as being applied by spraying using the spray device 20 and the former 18. Of course, the present disclosure contemplates any device for applying the adhesive layer 16 that is sufficient to sufficient to apply the adhesive layer in the desired variable pattern.

Figure 5:
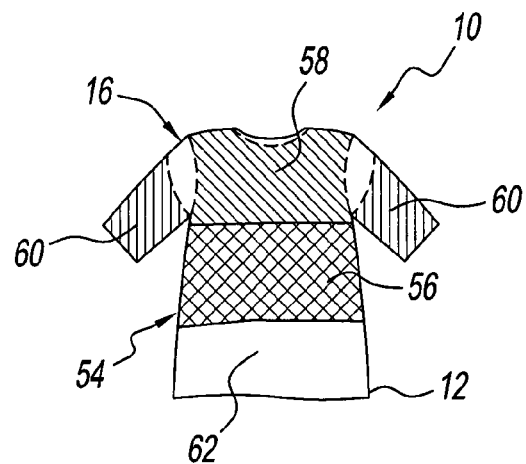
FIG. 5 is a front view of a shirt having an adhesive with a number of different zones according to the present disclosure.

Referring to now FIG. 5, the garment 10 is illustrated as a shirt 54 having the second ply 14 removed to reveal the first ply 12 with the adhesive layer 16 thereon. Again, the garment 10 has a number of different zones with each zone having a different or variable amount of adhesive in each zone. In this embodiment, the shirt 54 has a first zone 56, a second zone 58, a third zone 60, and a fourth zone 62.

The first zone 56 preferably has the largest amount of adhesive layer 16, while the fourth zone 62 has no adhesive. Thus, the first zone 56 provides control while the fourth zone 62 provides a maximum amount of breathability and flexibility. The second zone 58 and the third zone 60 may have a reduced amount of adhesive for more breathability and flexibility than the first zone 56.

Figure 6:
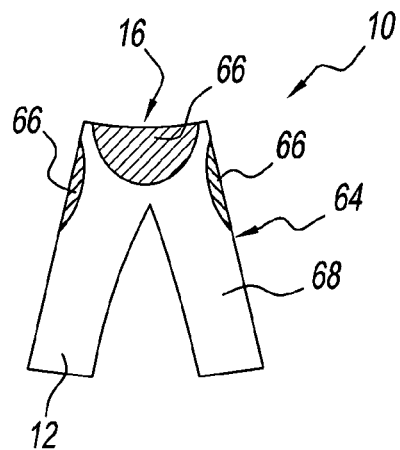
FIG. 6 is a front view of a pair of pants having a number of different zones.

Referring now to FIG. 6, the garment 10 is illustrated as a pair of pants 64 having the second ply 14 removed to reveal the first ply 12 with the adhesive layer 16 thereon. Again, the garment 10 has a number of different zones with each zone having a different or variable amount of adhesive in each zone. In this embodiment, the pants 64 have a number of zones 66 for control and one or more zones 66 for breathability and flexibility.

In some embodiments of the present disclosure, adhesive layer 16 is an adhesive and/or elastomer with a controlled porosity and/or thickness. In other embodiments, the adhesive layer 16 has a variable porosity and/or thickness within the resultant garment 10. In this manner, the pattern of porosity and/or thickness can be controlled through the application to enhance support, stretch, recovery, power and breathability of the garment 10. Thus, adhesive layer 16 is applied to first and/or second plies 12, 14 to provide desired structure and support.

Adhesive layer 16 can be a hot-melt adhesive, a polyurethane (e.g., TPU), a polyamide (e.g., COPA's), a copolyester (e.g., COPE), an elastomeric alloy (e.g., TPV), a polyolefin (e.g., TPO), a stryene (e.g., SBC), and any combinations thereof.

It is contemplated by the present disclosure for the thickness and/or porosity of adhesive layer 16 to be varied by varying the amount of adhesive layer 16 applied to first and/or second plies 12, 14. It is also contemplated by the present disclosure for the thickness and/or porosity of adhesive layer 16 to be varied by foaming the adhesive layer 16. Here, the thickness and/or porosity of adhesive layer 16 can be varied without adding additional weight to garment 10.

During manufacture of garment 10, adhesive layer 16 is applied to first ply 12 while in a substantially liquid form and with a viscosity sufficient to adhere the adhesive layer to the first ply, but with sufficient resistance to flow to maintain the desired porosity and/or thickness as applied. For example, it is contemplated that adhesive layer 16 is applied to first ply 12 at a viscosity of between about 30,000 to about 200,000 centipoise (cps). Further, second ply 14 is applied to adhesive layer 16 while the adhesive layer maintains sufficient tack to adhere to the second ply.

It is contemplated by the present disclosure for adhesive layer 16 to be applied to first ply 12 by a process such as, but not limited to, a screen printing process, a Gravure coating process, a scatter coating process, a hot melt application process, an extrusion process, and a spray process.

In the example where adhesive layer 16 to be applied to first ply 12 by Gravure coating process, the engraved roller can include a decorative pattern and/or a random hole pattern therein. In the example where adhesive layer 16 to be applied to first ply 12 by an extrusion process, the adhesive layer can be extruded onto the first ply in a partially cured state and can be completely cured after application of second ply 14. When adhesive layer 16 to be applied to first ply 12 by a scatter coating process, the powdered adhesive can be cured after application of second ply 14 by any desired process such as, an ultraviolet light cure or a heat and pressure cure.

Figure 7:
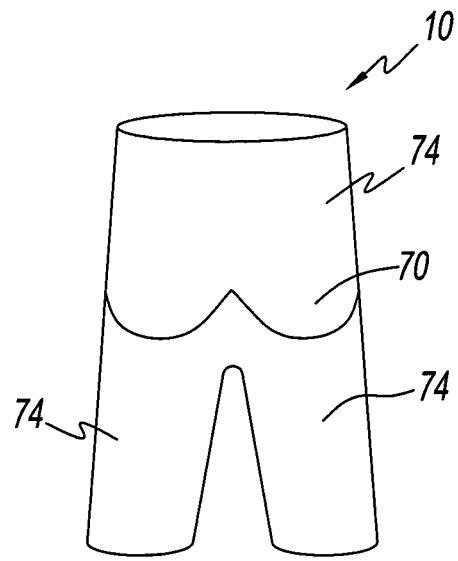
FIG. 7 is a rear perspective view of an exemplary embodiment of a control panty according to the present disclosure.
Figure 8:
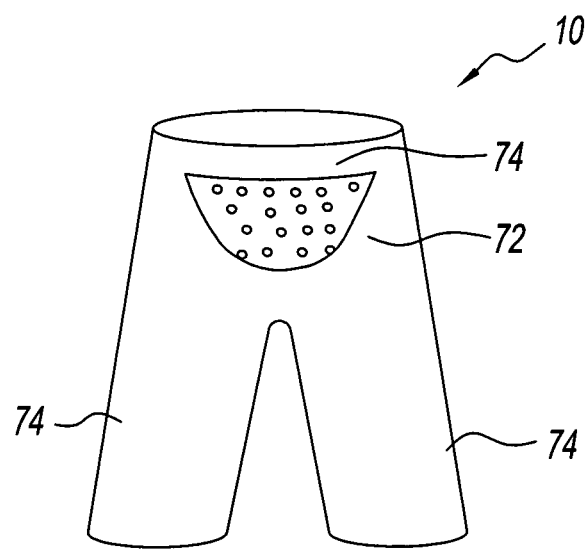
FIG. 8 is a front perspective view of the control panty of FIG. 7.

Referring now to FIGS. 7 and 8, another exemplary embodiment of a garment 10, illustrated as a control panty, according to the present disclosure is shown.

Garment 10 has a first zone 70 of adhesive layer 16, a second zone 72 of the adhesive layer, and a third zone 74 of the adhesive layer. First zone 70 is positioned at a back region of garment 10, while second zone 72 is positioned at a front region of the garment. Third zone 74 is defined in all remaining regions of the garment 10.

In first zone 70, adhesive layer 16 has a thickness and/or weight per unit area sufficient to provide a lifting and controlling attribute to the buttock region of garment 10. Conversely, adhesive layer 16 in second zone 72 has a thickness and/or weight per unit area sufficient to provide a sliming attribute to the stomach region of garment 10. Adhesive layer 16 in third zone 74 has a minimum thickness that is merely sufficient to secure the first and second plies (not shown) to one another.

Figure 9:
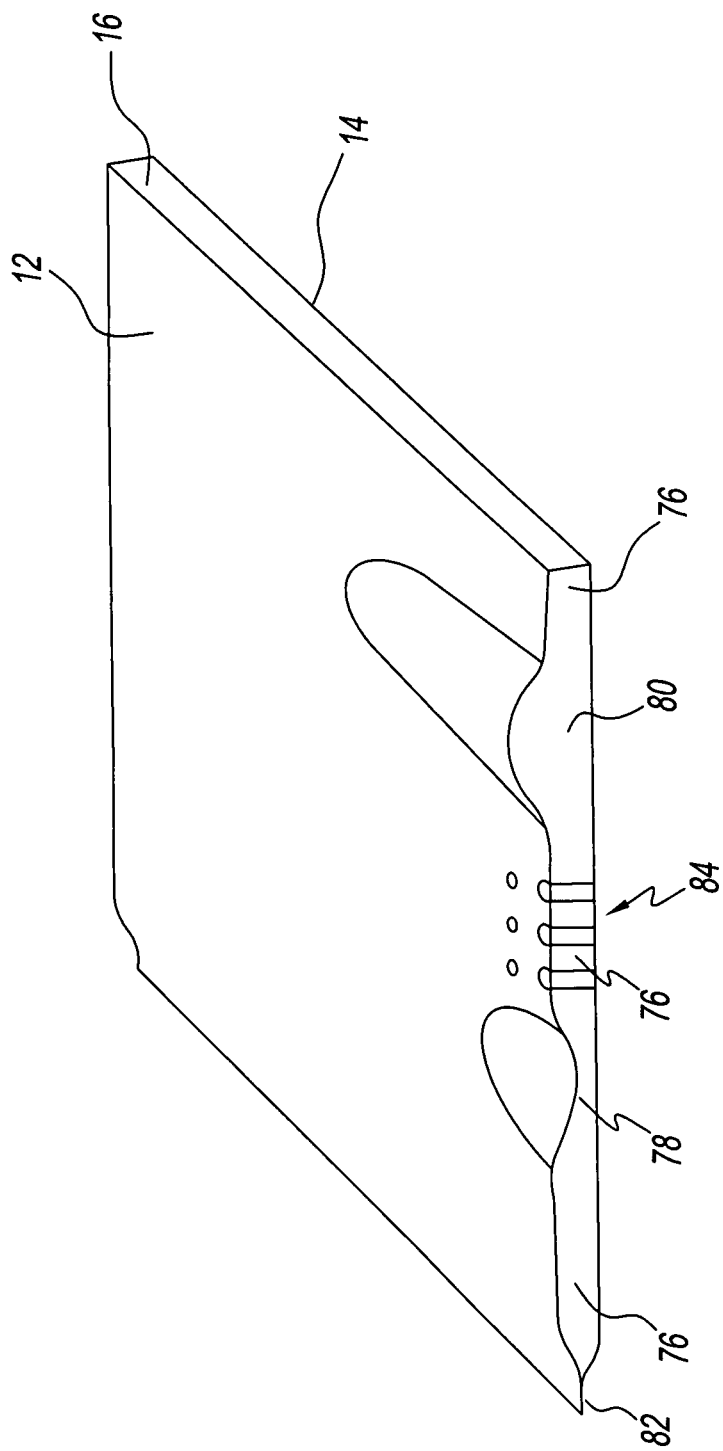
FIG. 9 is a partial sectional view of an exemplary embodiment of a garment according to the present disclosure.
Figure 10:
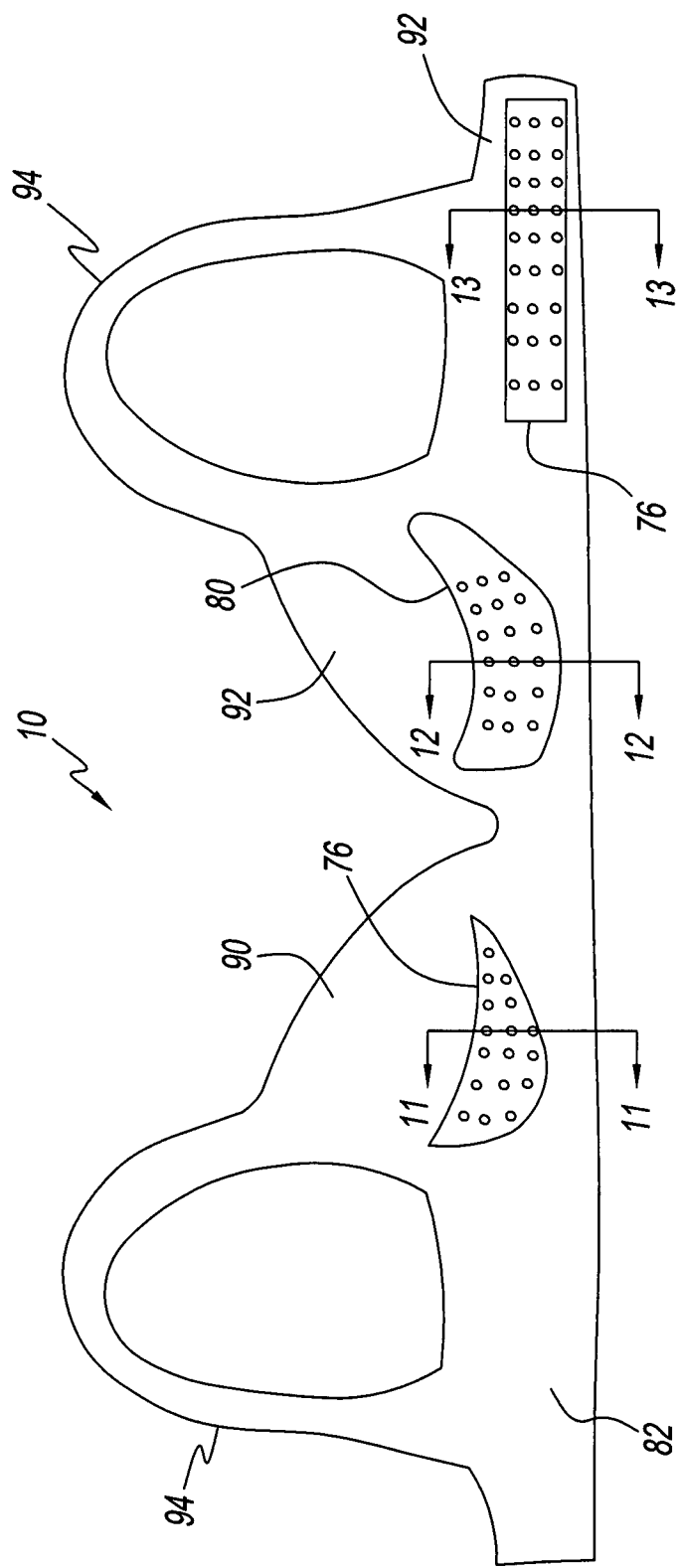
FIG. 10 is a plan view of an exemplary embodiment of a brassiere according to the present disclosure.

Referring now to FIG. 9, a partial sectional view of garment 10 is shown to better illustrate certain aspects of the present disclosure. Here, garment 10 includes first ply 12, second ply 14, and adhesive layer 16. Adhesive layer 16 is shown having one or more normal thickness regions 76, a thinned region 78, a thickened region 80, and a minimum thickness region 82. Minimum thickness region 82 includes only a sufficient amount of adhesive necessary to secure the first and second plies 12, 14 to one another.

Garment 10 can include any desired number, shape, size or combinations of regions 76, 78, 80, 82 positioned within the garment. In this manner, regions 76, 78, 80, 82 can be provide garment 10 with desired shaping and control properties.

In some embodiments, garment 10 can include a plurality of perforations 84 defined in any of regions 76, 78, 80, 82. Perforations 84 can increase the porosity of garment 10 in a desired location. In addition, perforations can increase the stretchability of garment 10 in a desired location.

For example, garment 10 is shown having perforations 84 in one normal thickness region 76. By way of comparison, the normal thickness regions 76 having perforations 84 is more stretchable than a region 76 having the same thickness but no perforations.

Referring now to FIGS. 10 through 13, another an exemplary embodiment of garment 10, illustrated as a brassiere, according to the present disclosure is shown. Here, garment 10 is illustrated having one or more regions 76, 78, 80, 82 discussed above with respect to FIG. 9.

Garment 10 includes a first breast cup 90, a second breast cup 92, a back encircling portion 92, and a pair of shoulder straps 94. Garment 10 includes minimum thickness region 82 in all but first breast cup 90, second breast cup 92, back encircling portion 92.

Figure 11:
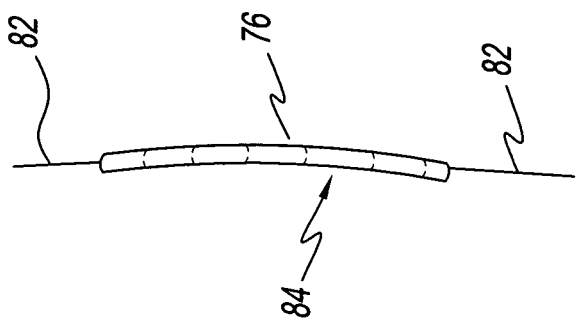
FIG. 11 is a sectional view of the brassiere of FIG. 10, taken along lines 11-11.

First breast cup 90 is illustrated in FIG. 11 having normal thickness 76 and perforations 84. Here, adhesive layer 16 is configured to provide support and control to garment 10.

Figure 12:
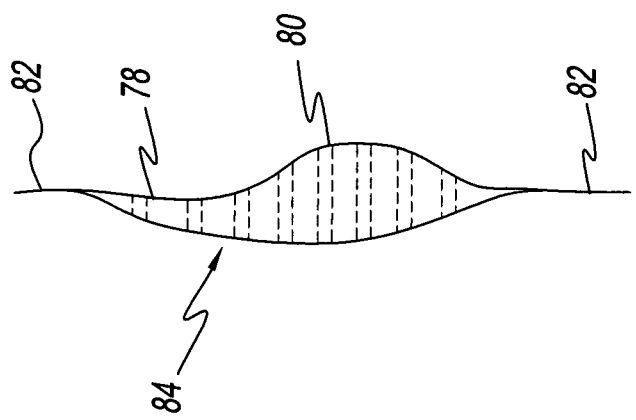
FIG. 12 is a sectional view of the brassiere of FIG. 10, taken along lines 12-12.

Second breast cup 92 is illustrated in FIG. 12 having reduced thickness 78, increased thickness 80, and perforations 84. Here, adhesive layer 16 is configured to provide shaping to garment 10.

Figure 13:
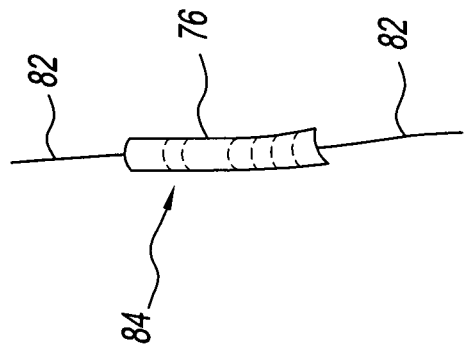
FIG. 13 is a sectional view of the brassiere of FIG. 10, taken along lines 13-13.

Back encircling portion 92 is illustrated in FIG. 13 having normal thickness 76 and perforations 84. Here, adhesive layer 16 is configured to provide support and control to garment 10.

It should be recognized that garment 10 is illustrated for purposes of discussion only as having different thicknesses between first and second breast cups. Of course, it is also contemplated by the present disclosure for first and second breast cups 90, 92 to have symmetrical thicknesses.

Further, it is contemplated for garment 10 to have one common thickness in all regions of the garment. For example, it is contemplated by the present disclosure for garment 10 to have first and second plies 12, 14 joined together by adhesive layer 16 having a normal thickness regions 76, where the normal thickness is between about 0.010 inches to about 0.25 inches.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances.

What is claimed is:

1. A method of manufacturing a garment, comprising:
providing first and second plies of material shaped to form at least a portion of a garment;
applying an adhesive layer to at least one of the first ply and second ply by a process selected from the group consisting of spraying, beading, pouring, squeezing, application by a tool, application by a squeegee tool, and any combinations thereof, the adhesive layer being continuous and transitioning in thickness between a first zone and a second zone;
arranging said first and second plies with respect to one another so that said adhesive layer is therebetween; and
activating said adhesive layer to secure said first and second plies to one another.

2. The method of claim 1, further comprising applying none of said adhesive layer to said first ply or said second ply in a third tone where flexibility is desired.

3. The method of claim 1, wherein said adhesive layer in said first zone has a thickness of between about .002 inches to about .006 inches.

4. The method of claim 3, wherein, said thickness is about .004 inches.

5. The method of claim 1 wherein said adhesive layer in said second zone has a thickness or under about .002 inches.

* * * * *